United States Patent [19]

Sterling

[11] Patent Number: 4,799,773
[45] Date of Patent: Jan. 24, 1989

[54] LIQUID CRYSTAL LIGHT VALVE AND ASSOCIATED BONDING STRUCTURE

[75] Inventor: Rodney D. Sterling, Carlsbad, Calif.

[73] Assignee: Hughes Aircraft Company, Los Angeles, Calif.

[21] Appl. No.: 90,053

[22] Filed: Aug. 27, 1987

[51] Int. Cl.⁴ .............................................. G02F 1/135
[52] U.S. Cl. ................................................. 350/342
[58] Field of Search ....................... 350/342; 250/331; 428/657

[56] References Cited

U.S. PATENT DOCUMENTS

| | | | |
|---|---|---|---|
| 3,716,406 | 5/1971 | Scholl et al. | 117/217 |
| 3,811,180 | 5/1974 | Braunstein et al. | 29/572 |
| 3,824,002 | 7/1974 | Beard | 350/160 |
| 3,976,361 | 8/1976 | Fraas et al. | 350/160 |
| 4,019,807 | 4/1977 | Boswell et al. | 350/160 |
| 4,114,991 | 9/1978 | Bleha, Jr. et al. | 350/338 |
| 4,124,278 | 11/1978 | Grinberg et al. | 350/342 |
| 4,525,032 | 6/1985 | Hilsum | 350/330 |

Primary Examiner—Stanley D. Miller
Assistant Examiner—Anita E. Pellman
Attorney, Agent, or Firm—Joseph E. Szabo; Anthony W. Karambelas

[57] ABSTRACT

A LCLV device exhibiting improved performance capabilities fabricated using an amorphous silicon photoconductor layer, a cadmium telluride blocking layer, a titanium dioxide mirror and a sepcial bonding layer which enables attachment of the cadmium telluride blocking layer to the amorphous silicon. The bonding layer includes silicon dioxide sputtered in successive argon and argon/oxygen atmospheres followed by cadmium telluride sputtered in successive argon/oxygen and argon atmospheres. The bonding layer may also be used in other applications to bond a cadmium telluride layer to single crystal silicon or silicon dioxide layers.

24 Claims, 1 Drawing Sheet

LIQUID CRYSTAL LIGHT VALVE AND ASSOCIATED BONDING STRUCTURE

BACKGROUND OF THE INVENTION

1. Field of the Invention

The subject invention relates to liquid crystal light valves (LCLV's) and more particularly to an improved light valve employing a titanium dioxide/silicon dioxide mirror and a bonding structure enabling the use of such a mirror.

2. Description of Related Art

In the prior art, liquid crystal light valves (LCLV's) are known. These devices have diverse application as light amplifiers, projectors and image processors. A prior art LCLV is disclosed in U.S. Pat. No. 4,019,807 assigned to Hughes Aircraft Company. The light valve of that patent employs successive device layers comprising a cadmium sulfide CdS photoconductor, a cadmium telluride CdTe light absorbing layer, a dielectric mirror, an insulating silicon dioxide layer, and a liquid crystal layer. This device structure is sandwiched between indium-tin-oxide transparent electrodes deposited on optical quality glass flat substrates. The particular function of the dielectric mirror is to provide several orders of magnitude of light blocking to prevent high light intensity from saturating the photoconductive layer.

One type of prior art dielectric mirror has been fabricated using a silicon/silicon dioxide (Si/SiO$_2$) design. This mirror design has proved to have disadvantages in that it lacks repeatability, provides relatively low resolution and has an output of limited spectrum. In particular, the Si/SiO$_2$ mirror of the prior art has been unable to operate in the blue area of the spectrum. The resistivity of Si/SO$_2$ also limits the available resolution. In practice, it has proved difficult to produce two devices employing Si/SiO$_2$ mirrors which have the same characteristics.

In addition, the CdS photoconductors of prior art devices, such as that of the '807 patent, exhibit a response time which is too slow for some applications such as interfacing with a video raster.

Other practical problems also confront the design of an improved LCLV structure. The foremost of these is the necessity to produce a structure in which various structural layers selected to exhibit improved properties will all adhere together well.

SUMMARY OF THE INVENTION

It is therefore an object of the invention to improve LCLV devices;

It is another object of the invention to enhance the spectral response of LCLV devices;

It is another object of the invention to improve resolution of a LCLV device;

It is yet another object of the invention to shorten the response time of LCLV devices;

It is yet another object of the invention to provide a LCLV device which offers repeatability in manufacture.

According to the invention, an improved LCLV device features an amorphous silicon photoconductor layer and a dielectric mirror layer employing titanium dioxide (TiO$_2$) A special bonding structure is used to bond a cadmium telluride (CdTe) blocking layer to the amorphous silicon. A titanium dioxide/silicon dioxide layered dielectric mirror is then applied to the cadmium telluride blocking layer.

The titanium dioxide layer provides greatly improved resolution and spectral capabilities. The amorphous silicon contributes an improved photoconductor response time, approaching the speed required for raster scan displays.

The special bonding structure ties the structure together and contributes to an overall improvement in repeatability. The bonding structure includes successive layers comprising first and second SiO$_2$ layers and first and second CdTe blocking layers. The adjacent SiO$_2$ and CdTe layers are oxygen enriched and the device, including the bonding structure, is annealed prior to application of a CdTe layer to redistribute the oxygen. The special bonding structure is not limited to application to amorphous silicon but may be employed to bond CdTe to various other materials.

DETAILED DESCRIPTION OF THE PREFERRED EMBODIMENT

Figure 1:
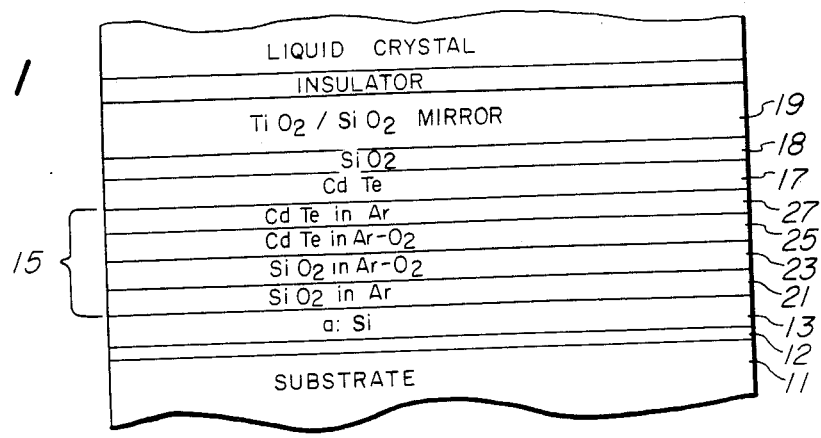
FIG. 1 is a side sectional drawing illustrating the LCLV structure of the preferred embodiment.

The preferred LCLV structure is shown in cross-section in FIG. 1. It includes a suitable glass substrate 11, an indium tin oxide (ITO) layer 12, an amorphous silicon photoconductor layer 13, a Si bonding structure 15, a CdTe blocking layer 17, a SiO$_2$ layer 18 and a TiO$_2$/SiO$_2$ dielectric mirror 19. The Si bonding structure 15 includes four layers 21, 23, 25, 27. The four layers, 21, 23, 25, 27, respectively comprise a first layer 21 of silicon dioxide (SiO$_2$), a second oxygen-rich layer 23 of SiO$_2$, an oxygen-rich layer 25 of CdTe, and a second layer 27 of CdTe.

The first SiO$_2$ layer 21 is fabricated by deposition in an argon atmosphere, while the second oxygen-rich layer of SiO$_2$ is deposited in an atmosphere comprising argon and oxygen. The first oxygen-rich layer 25 of CdTe is deposited in atmosphere also comprising argon and oxygen, while the second CdTe layer 27 is deposited in an atmosphere of pure argon.

Above the second CdTe layer 27, the CdTe layer 17 and SiO$_2$ layer 18 are deposited. Above the SiO$_2$ layer 18 is the SiO$_2$/TiO$_2$ dielectric mirror 19, which includes twenty-four layers which alternate between TiO$_2$ and SiO$_2$. Above the TiO$_2$/SiO$_2$ mirror, an insulator and liquid crystal are mounted as known in the prior art and shown, for example, in U.S. Pat. No. 4,019,807.

The structure and fabrication of such TiO$_2$/SiO$_2$ dielectric mirrors is well-known in the art per se and will not be further described herein in the interest of brevity. A "soft" ITO (Indium Tin Oxide) process as described hereafter is used to adhere the amorphous silicon layer 13 to a glass substrate such as substrate 11 prior to attachment of the Si bonding structure 15.

Without the Si bonding structure 15, a TiO$_2$/SiO$_2$ mirror formed over CdTe will peel-up and blister. The disclosed Si bonding structure 15 enables CdTe to be bonded to the amorphous silicon layer 13, allowing the use of a CdTe/TiO$_2$/SiO$_2$ mirror design with an amorphous silicon photoconductor. The mirror functions generally to provide a light attenuating function, while the amorphous silicon photoconductor varies the electric field across the liquid crystal in response to incident light.

Figure 2:
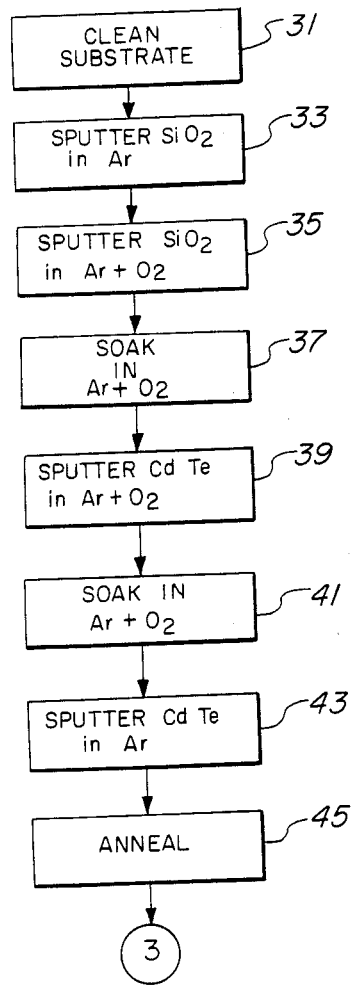
FIG. 2 is a flow block diagram illustrating fabrication of a LCLV device according to the preferred embodiment.
Figure 3:
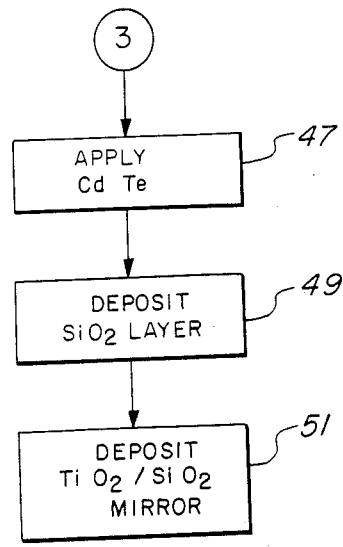
FIG. 3 is a flow block diagram further illustrating fabrication of an LCLV device.

A step-by-step process for depositing the Si bonding structure 15 onto an amorphous silicon layer 13 is shown in FIG. 2 and FIG. 3. This process may be carried out on a commercially available machine such as the Randex 2400-8J made by Perkin-Elmer Corporation, Norwalk, Conn.

According to the process of FIG. 2, the glass substrate is first cleaned (step 31) by sputter etching at 200W in 7.75±0.25 microns of argon for three minutes. Silicon dioxide is then bias sputtered onto the substrate for eight minutes at 200W in 7.75±0.25 microns of argon (step 33). At the end of step 33, the SiO$_2$ layer 21 of FIG. 1 is formed.

With the SiO$_2$ plasma still running, the atmosphere is changed to an argon - oxygen mixture comprised of 7.75±0.25 microns argon and 2.00±0.25 microns of oxygen, giving a total mixture pressure of 9.75±0.25 microns. The silicon dioxide sputter in this argon/oxygen mix, shown as step 35, is continued for eight minutes.

At the end of the eight minute argon/oxygen bias sputter, step 35, the substrate is allowed to soak for five minutes in the argon/oxygen mixture with the RF generator turned off, step 37. The oxygen rich SiO$_2$ layer 23 is thus formed.

Next, in step 39, CdTe is bias sputtered onto the oxygen-rich SiO$_2$ layer 23 for eight minutes at 200 W in the 9.75±0.25 micron mixture of argon and oxygen. In step 41, the structure is allowed to soak in the argon/oxygen mixture for another five minutes with the RF generator off. At the end of step 41, the oxygen-rich CdTe layer 25 is formed.

After soaking according to step 41, a second eight-minute bias sputter of CdTe is performed, step 43. The second sputter operation 43 is performed at 200W and in an atmosphere of 7.75±0.25 pk microns of argon to form the second CdTe layer 27.

The final step in forming the Si bonding structure 15 is to anneal the structure formed in steps 31–43. The annealing operation, step 45, is performed in a $10^{-6}$ vacuum. The structure including the amorphous silicon layer 13, the substrate 11, and the bonding structure 15 is heated from room temperature to 200 degrees Centigrade (°C.) over 35 minutes, then heated to 235° C. over 10 minutes, then back to 200° C. over 10 minutes and from 200° C. down to room temperature over 35 additional minutes. The 35 minute heatup and cool down periods serve to avoid thermal shock and cracking of the device. In the inventor's experience, a variation of the 235° temperature by ±5° C. will not adversely affect results, nor will a variation of ± one minute in the 10 minute time intervals on either side of 235° C.

After annealing, the CdTe layer 17, the SiO$_2$ layer 18 and the TiO$_2$/SiO$_2$ dielectric mirror are applied. Initially, in step 47, two microns of CdTe are applied, for example, by vacuum deposition as known in the prior art. An additional 400 Angstroms of CdTe is then sputtered onto the two micron CdTe layers by known sputtering techniques. In step 49, the SiO$_2$ layer 18 is sputtered to a thickness of 1600 Angstroms. The TiO$_2$/SiO$_2$ mirror is thereafter applied by deposition procedures known in the art in step 51. Other mirror structures adherable to CdTe may also be used, as known in the art.

The annealing operation 45 redistributes the oxygen molecules throughout the device. This redistribution of oxygen is the key to adhering the amorphous silicon layer 13 to the CdTe layer 17. It has been found that if the above process is performed and it is later sought to deposit the CdTe layer 17, the layer 17 will not adhere if a time of approximately three weeks has elapsed since the device was annealed. In such case, it is necessary to re-anneal the structure after which the CdTe layer 17 will properly adhere. Once the CdTe layer 17 is properly adhered, the resulting structure exhibits a satisfactory lifetime.

It is to be noted that the bonding structure 15 can also be used to adhere structures to crystal silicon and glass (SiO$_2$) layers as well as to amorphous silicon. Thus, the bonding structure 15 is useful in other applications where crystal silicon or glass layers may be preferred, including single crystal silicon LCLV's.

To attach the amorphous silicon layer 13 to a glass substrate 11 as shown in FIG. 1, a 1,000 Angstroms (Å) thick layer 12 of indium tin oxide (ITO) is first deposited on the glass substrate 11 prior to application of the amorphous silicon layer 13. The relative texture of the ITO surface which results is believed to contribute to the adherence of the amorphous silicon. The ITO is applied by an evaporation process wherein an electron beam evaporates the ITO in a partial pressure of oxygen. Such ITO deposition procedures are generally known. However, the temperature, rate of deposition and oxygen flow rate are controlled during the deposition operation in a manner which provides the desired "soft" ITO layer 12 and adherence properties.

According to the preferred soft ITO deposition procedure, the substrate is first soaked at 365° C. for one hour at an oxygen pressure of 4 to $5 \times 10^{-6}$ torr. At 55 minutes into the soak, additional oxygen is introduced through an air control system until the pressure reaches about $6 \times 10^{-5}$ torr. The oxygen is stabilized for five minutes. Then the electron beam is turned on and deposition of the first 500 Angstroms of ITO begins. The deposition rate is maintained at about 10–15 Angstroms per second until the required 500 Angstroms thickness is achieved. Pressure is then allowed to rise to about $6 \times 10^{-4}$ torr by manipulation of the oxygen flow rate via the air control system. The substrate 11 and deposited ITO are then baked for 10 minutes at 365° C. After baking, the procedure is repeated to apply the remaining 500 Angstroms of ITO. After the ITO layer 12 is formed, amorphous silicon is deposited by known plasma enhanced chemical vapor deposition (PECVD) procedures to a thickness of, e.g., 30 microns.

The foregoing description has disclosed an improved LCLV device employing a TiO$_2$/SiO$_2$ mirror 19 and an amorphous silicon photoconductor 13 with a unique bonding structure 15 connecting the mirror 19 and photoconductor 13 through a CdTe blocking layer 17. Such a structure yields lower frequency operation to give better sensitivity, high contrast, improved spectral output and high repeatability. A low cost, near TV rate, LCLV is thus provided which may find application in commercial color projectors, flight simulators, optical data accessing, adaptive optics and other uses.

It will therefore be apparent to those skilled in the art that various adaptations and modifications of the disclosed LCLV and associated bonding structure are possible without departing from the scope of the invention. Therefore, it is to be understood that, within the scope of the appended claims, the invention may be practiced other than as specifically described herein.

What is claimed is:

1. In a liquid crystal light valve (LCLV) device, the structure comprising:
    a substrate;
    an amorphous photoconductive layer formed on said substrate;
    a blocking layer;
    a mirror layer attached to said blocking layer; and
    means for bonding said blocking layer to said amorphous photoconductive layer.

2. The LCLV device structure of claim 1 wherein said blocking layer comprises cadmium telluride.

3. The LCLV device structure of claim 1 wherein said mirror layer includes titanium dioxide.

4. The LCLV device structure of claim 3 wherein said blocking layer comprises cadmium telluride.

5. The LCLV device structure of claim 4 wherein said amorphous photoconductive layer comprises an amorphous silicon photoconductive layer.

6. The LCLV device structure of claim 5 wherein said means for bonding includes oxygen enriched silicon dioxide.

7. The LCLV device structure of claim 5 wherein said means for bonding comprises:
    silicon dioxide deposited in argon;
    silicon dioxide and cadmium telluride each deposited in an argon and oxygen mixture; and
    cadmium telluride deposited in argon.

8. The LCLV device structure of claim 5 wherein said means for bonding comprises a layered, annealed structure including:
    a silicon dioxide layer adjacent said amorphous photoconductive layer;
    an oxygen enriched silicon dioxide layer adjacent said silicon dioxide layer;
    an oxygen enriched cadmium telluride layer adjacent said oxygen enriched silicon dioxide layer; and
    a cadmium telluride layer adjacent said oxygen enriched cadmium telluride layer.

9. The LCLV device structure of claim 1 wherein said mirror layer comprises a dielectric mirror including alternating layers of silicon dioxide and titanium dioxide.

10. The LCLV device structure of claim 9 wherein said blocking layer comprises cadmium telluride.

11. The LCLV device structure of claim 10 wherein said amorphous photoconductive layer comprises an amorphous silicon photoconductive layer.

12. The LCLV device of claim 11 wherein said means for bonding includes oxygen enriched silicon dioxide.

13. A structure for bonding cadmium telluride to a material containing silicon comprising:
    a silicon dioxide layer deposited in argon;
    successive silicon dioxide and cadmium telluride layers each deposited in an argon and oxygen mixture; and
    a cadmium telluride layer deposited in argon.

14. The structure of claim 13 wherein the material containing silicon comprises amorphous silicon.

15. The structure of claim 13 wherein the material containing silicon comprises single crystal silicon.

16. The structure of claim 13 wherein the material containing silicon comprises silicon dioxide.

17. The structure of claim 13 wherein said structure is annealed.

18. A structure for bonding cadmium telluride to a base layer comprising amorphous silicon, single crystal silicon or silicon dioxide, the structure comprising:
    a silicon dioxide layer formed on said base layer;
    an oxygen enriched silicon dioxide layer formed on said silicon dioxide layer;
    an oxygen enriched cadmium telluride layer formed on said oxygen enriched silicon dioxide layer; and
    a cadmium telluride layer formed on said oxygen enriched cadmium telluride layer.

19. The structure of claim 18 wherein the structure is annealed.

20. In a liquid crystal light valve (LCLV) device, the structure comprising:
    a substrate;
    an amorphous photoconductive layer formed on said substrate;
    a blocking layer;
    a mirror layer attached to said blocking layer; and
    means for bonding said blocking layer to said amorphous photoconductive layer wherein said means for bonding includes oxygen enriched silicon dioxide.

21. In a liquid crystal light valve (LCLV) device, the structure comprising:
    a substrate;
    an amorphous photoconductive layer formed on said substrate;
    a blocking layer;
    a mirror layer attached to said blocking layer; and
    means for bonding said blocking layer to said amorphous photoconductive layer wherein said means for bonding comprises:
    silicon dioxide deposited in argon;
    silicon dioxide and cadmium telluride each deposited in an argon and oxygen mixture; and
    cadmium telluride deposited in argon.

22. In a liquid crystal light valve (LCLV) device, the structure comprising:
    a substrate;
    an amorphous photoconductive layer formed on said substrate;
    a blocking layer;
    a mirror layer attached to said blocking layer; and
    means for bonding said blocking layer to said amorphous photoconductive layer wherein said means for bonding comprises a layered, annealed structure including:
    a silicon dioxide layer adjacent said amorphous photoconductive layer;
    an oxygen enriched silicon dioxide layer adjacent said silicon dioxide layer;
    an oxygen enriched cadmium telluride layer adjacent said oxygen enriched silicon dioxide layer; and
    a cadmium telluride layer adjacent said oxygen enriched cadmium telluride layer.

23. In a liquid crystal light valve (LCLV) device, the structure comprising:
    a substrate;
    an amorphous photoconductive layer formed on said substrate;
    a blocking layer;
    a mirror layer attached to said blocking layer; and
    a bonding layer including an oxide and a cadmium-based compound attaching said blocking layer to said amorphous photoconductive layer.

24. The structure of claim 23 wherein said bonding layer is enriched with oxygen.

* * * * *